United States Patent [19]
Nicolau

[11] 3,832,899
[45] Sept. 3, 1974

[54] DYNAMOMETRICAL DEFLECTION MEASURING METHOD AND APPARATUS

[75] Inventor: Ioan Victor Nicolau, Prahova, Romania

[73] Assignee: Institutal De Cercetare Si Proiectare Tehnolocica Pentru Industria Extractiva De Petrol Si Gaze, Cimpina, Romania

[22] Filed: Feb. 17, 1972

[21] Appl. No.: 227,024

[52] U.S. Cl. ............................... 73/144, 73/136 R
[51] Int. Cl. ............................................. G01l 5/08
[58] Field of Search................ 73/144, 136 R; 318/6

[56] References Cited
UNITED STATES PATENTS
2,185,836  1/1940  Croco.......................... 318/6 UX R

FOREIGN PATENTS OR APPLICATIONS
671,301    10/1963  Canada................................ 73/144
1,088,261   9/1954  France................................. 73/144
236,815     3/1970  U.S.S.R............................... 73/144

*Primary Examiner*—Charles A. Ruehl

[57] ABSTRACT

In order to measure by the deflection method the tension exerted in a belt or chain cable without producing errors of measurement due to variations in the deflection angle, the apparatus utilizes a deflection system comprising a compression dynamometer and two articulated bars. The dynamometer is axially positioned and joined with one of the bars. The two bars are each journalled at one end at a predetermined distance from two fixed deflection points, and at their other ends are joined together to a deflection roll. The two bars of the deflection system are thus constantly maintained parallel to the deflected cable or belt portions. Accordingly the angel between the two bars always remains equal to the deflection angle of the cable or the chain, regardless of the numerical value of the deflection angle. As a result, the compression force in each of the two bars, which is measured by the dynamometer, is always proportional to the tension force in each of the two deflected cable or chain portions, independently of variations in the deflection angle. The apparatus is particularly useful as a drillometer on the dead end of an operating cable, or as a torsiometer mounted on the chain of an intermediate transmission, or on the actuating transmission of the enclosed rotary table of drilling rigs in the oil and gas industry.

3 Claims, 3 Drawing Figures

DYNAMOMETRICAL DEFLECTION MEASURING METHOD AND APPARATUS

BACKGROUND OF THE INVENTION

The invention relates to a method and apparatus used for measuring, by means of deflection, the tension force in a line of the chain cable or transmission belt variety which is subjected to tension in motion. The apparatus is particularly useful as a torsiometer on transmissions of drilling rigs, or in lines of dead-end type cable subjected to tension when stationary, and is also useful as a drillometer at the draw-works of operating oil and gas wells.

The classic method for dynamometrically measuring the tension in a line subjected to tension forces while either stationary or moving is by the use of a deflecting system; the resultant of the two tension forces are measured from the deflection point. A drawback of this method is lack of accuracy, because the value of the resultant of the two tension forces, measured from the deflection point, varies greatly as a result of small variations in the deflection angle. Moreover, when the lines are subjected to tension while in motion, such as with chain or transmission belts, the value of the resultant of the two tension forces at the deflection point depends on the distance between the two transmission wheels. This distance determines the geometery of the deflection system and it is therefore necessary to adjust the apparatus for each type of transmission.

A direct method of dynamometrical measurement of the tension in a line subjected to tension when stationary using a dynamometer inserted axially in a line is also known. A disadvantage of this method is the necessity for interrupting the continuity of the line to create two articulated loops in the line for insertion of the dyamometer, or it is necessary that the line be provided with a dead end having a loop to actuate the dynamometer. This method has a further drawback in that it cannot be applied to a line subjected to tension while moving, as in the case of deflection torsiometers for transmissions using chains or belts.

For a fuller understanding of the nature and objects of the invention, reference should be had to the following detailed description taken in connection with the accompanying drawings, in which:

FIG. 1 is a schematic showing the geometrical relationships in the deflection system of the invention, FIG. 2 is a side elevation view of an embodiment of the invention used as a self-adjusting deflection drillometer for systems operating with a chain-hoist, FIG. 3 is a side elevation view of an embodiment of the invention used as a self-adjusting deflection torsiometer for transmissions using chains or belts.

Similar reference characters refer to similar parts throughout the several views of the drawings.

SUMMARY OF THE INVENTION

The apparatus embodying the method of the invention is based upon the geometrical deflection system shown in FIG. 1, in which a line 1, subjected to tension force T is deflected relative to two fixed supports 2 and 3, with the aid of a deflection roll 4, in such a manner, that the two branches of the deflected line $1a$ and $1b$ form a deflection angle $\alpha$ with the axis of the string.

The deflecting roll 4 is journalled to one of the two ends of a deflection bar 5 having a fixed length, and to one of the two ends of a deflection bar 6 having a variable length since it also carries a hydraulic dynamometric transducer (dynamometer) 7. The stroke of dynamometer 7 depends on several factors: expansion of the liquid, compression of the remnant air cusion, etc. The two deflection bars 5 and 6 are joined at their two other ends with two fixed pivots 8 and 9, in such a manner that they are equal in length and parallel to the deflected line branches $1a$ and $1b$.

The deflection angle of line 1 may vary from the value $\alpha$ to the value $\alpha_o$, as a consequence of shortening the length of the deflection bar 6 from the value bc to the value $b_oc$; this is the result of a change in the stroke of the hydraulic dynamometrical transducer 7 due to several factors. In this case, the deflection bar 5, having a fixed length $ab$, is rotated about the pivot 8 in such a manner that the deflection roll 4 changes its revolving center from the point $b$ to the point $b_o$. For small variations in the deflection angle $\alpha$, with respect to normal operation of the hydraulic dynamometrical transducer 7, it can be assumed (by making small geometrical approximations) that the parallelogram zybc is deformable by rotation about the point a, so that it becomes the parallelogram $zy_ob_oc$. As it is ensured by initial geometrical considerations that the sides $zc$, $yb$, and $y_ob_o$ are equal and parallel, accordingly the sides $zy$ and $bc$, and $zy_o$ and $b_oc$ are respectively maintained parallel.

Based upon these geometrical considerations, a mechanical static equilibrium of the actuating forces are maintained. In this way the two tension forces T in the deflected line branches $1a$ and $1b$ remain equal, regardless of variations in the deflection angle $\alpha$, and they produce the resultant force $R = 2$ T $\sin\alpha$ for a deflection angle $\alpha$, and respectively the resultant force $R_o = 2$ T $\sin \alpha_o$ for a deflection angle $\alpha_o$. By means of the roll 4, the respective forces R and $R_o$ are respectively transmitted from the point Y in $b$ and from the point $Y_o$ in $b_o$. At the same time the resolution of the respective forces R and $R_o$ in the direction of the axes of the deflection bars 5 and 6 (which remain constantly parallel to the deflected line branches $1a$ and $1b$) ensures that the forces in the deflection bars 5 and 6 remain constantly equal to the forces in the deflected line branches $1a$ and $1 b$.

DESCRIPTION OF THE PREFERRED EMBODIMENTS

Figure 1:
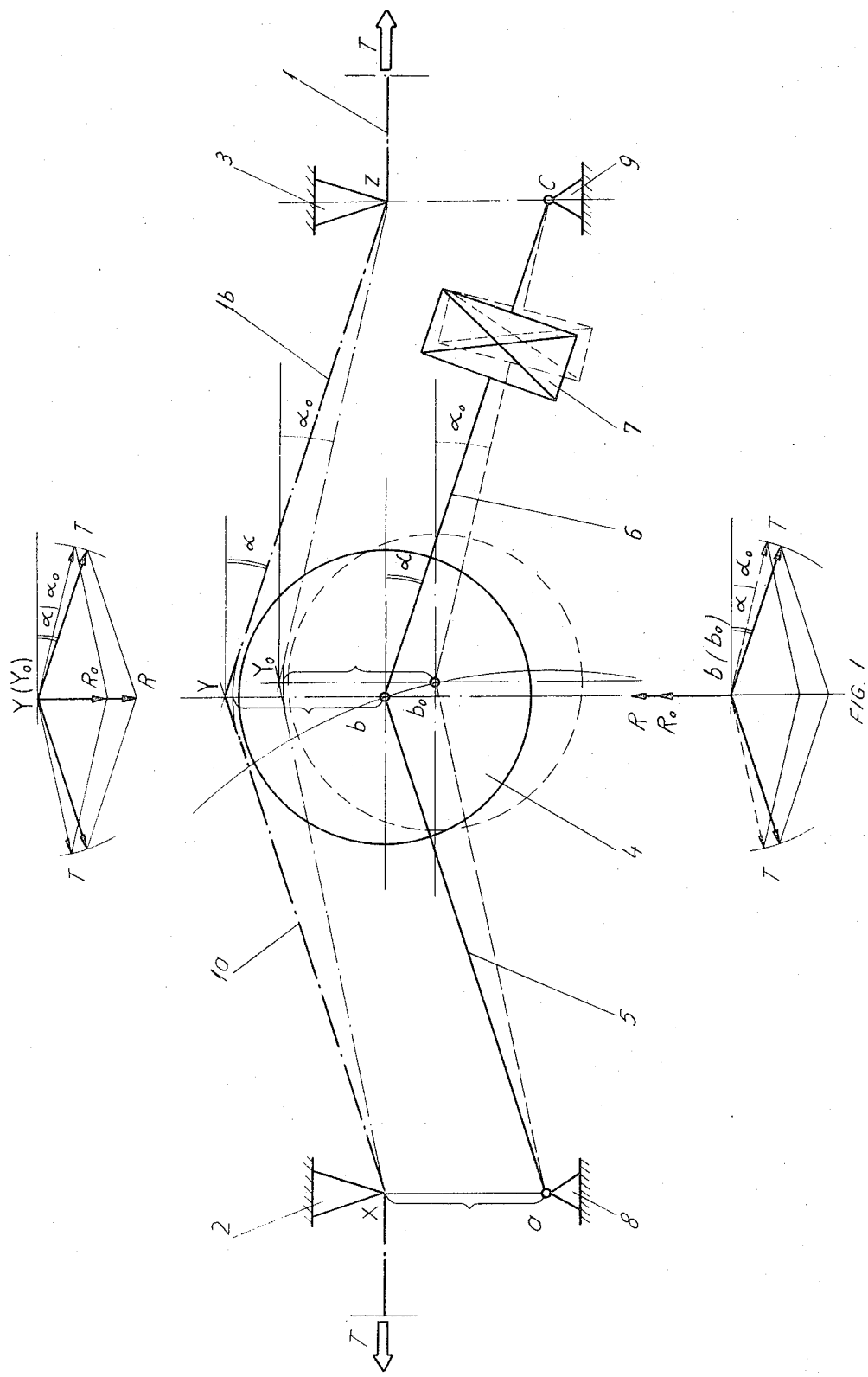
Figure 2:
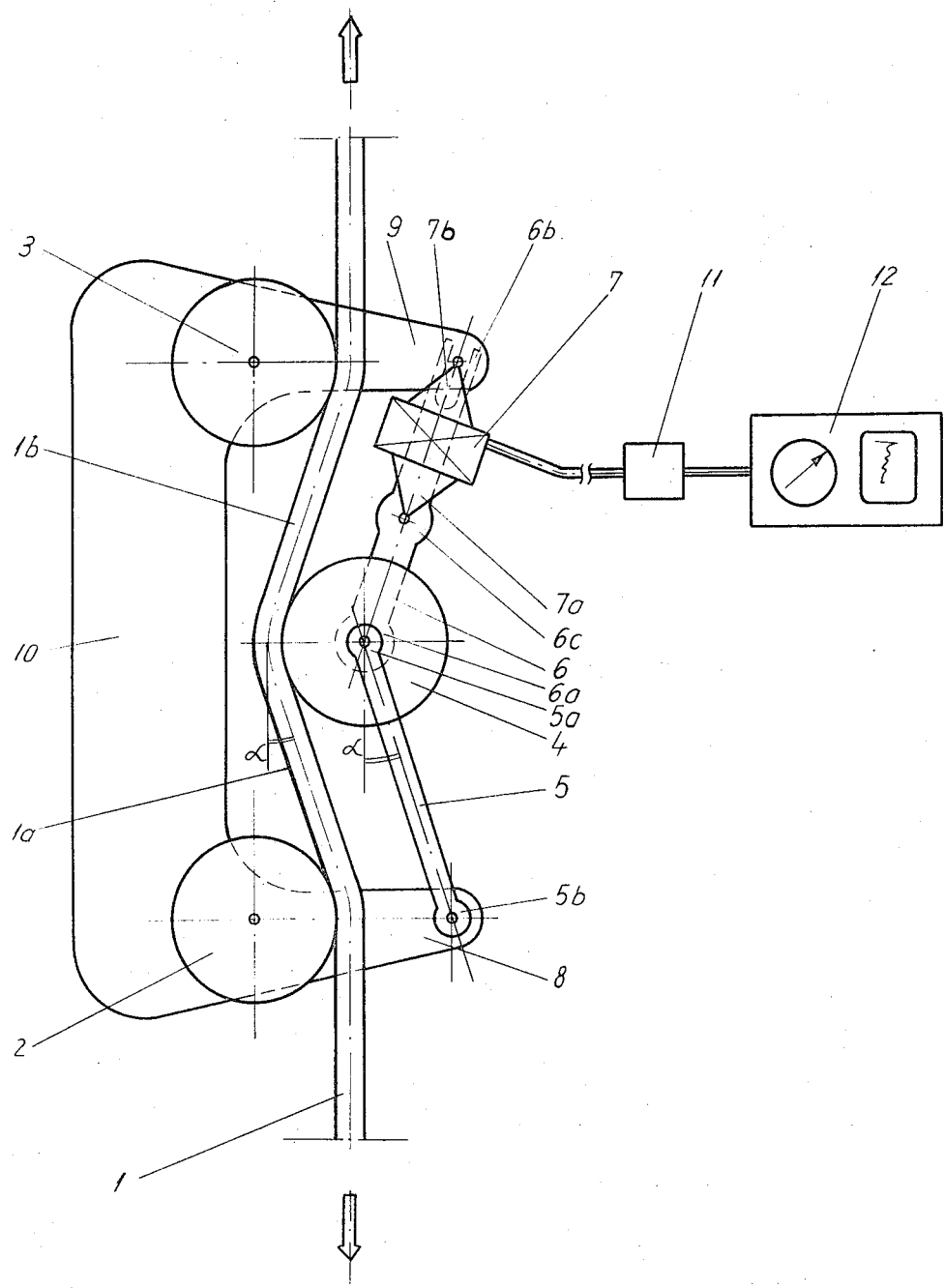

In the embodiment shown in FIG. 2, the deflection system in accordance with the invention is applied to a line of dead end type cable which is subjected to stationary tension in order to produce a self-adjusting deflection drillometer for hoisting operations at drilling rigs for oil and gas wells. Accordingly, in this embodiment, the dead end cable 1 is deflected by means of two fixed supporting rolls 2 and 3, and by means of a deflection roll 4, the result being that the two deflected cable branches $1a$ and $1b$ form a deflection angle $\alpha$ with the axis of the cable 1. The deflection roll 4 is joined to an end $5a$ of a deflection bar 5 having a fixed length, and with an end $6a$ of a deflection bar 6 having a variable length because it includes a hydraulic compression dynamometrical transducer 7. The deflection bar 6 has an alignment fork $6b$ which is journalled to a support 9 and joins with an end $7b$ of the dynamometer 7. The bar 6 further has a joint $6c$ placed between the joints $6a$ and the guiding fork $6b$, which serves to join bar 6 to the other end $7a$ of the dynamometer 7.

As a result of this manner of joining, by varying the working stroke of the dynamometer 7, the working length of the deflection bar 6 may also be varied, but the coaxial relationship between the dynamometer 7 and the deflection bar 6 is maintained.

In this way, the real force exerted axially in the bar 6, regardless of variations in the deflection angle α or of the working length of bar 6, can be continuously measured. In order to stiffen the deflection system, the supports of the fixed rolls 2 and 3 as well as the supports 8 and 9 of the deflection bars 5 and 6 are placed on a common U-shaped plate 10.

The pressure variations in the dynamometer 7 are then transmitted through a pulse dampener 11 to indicating system 12 which continuously indicates and records the tension force in the cable.

Figure 3:
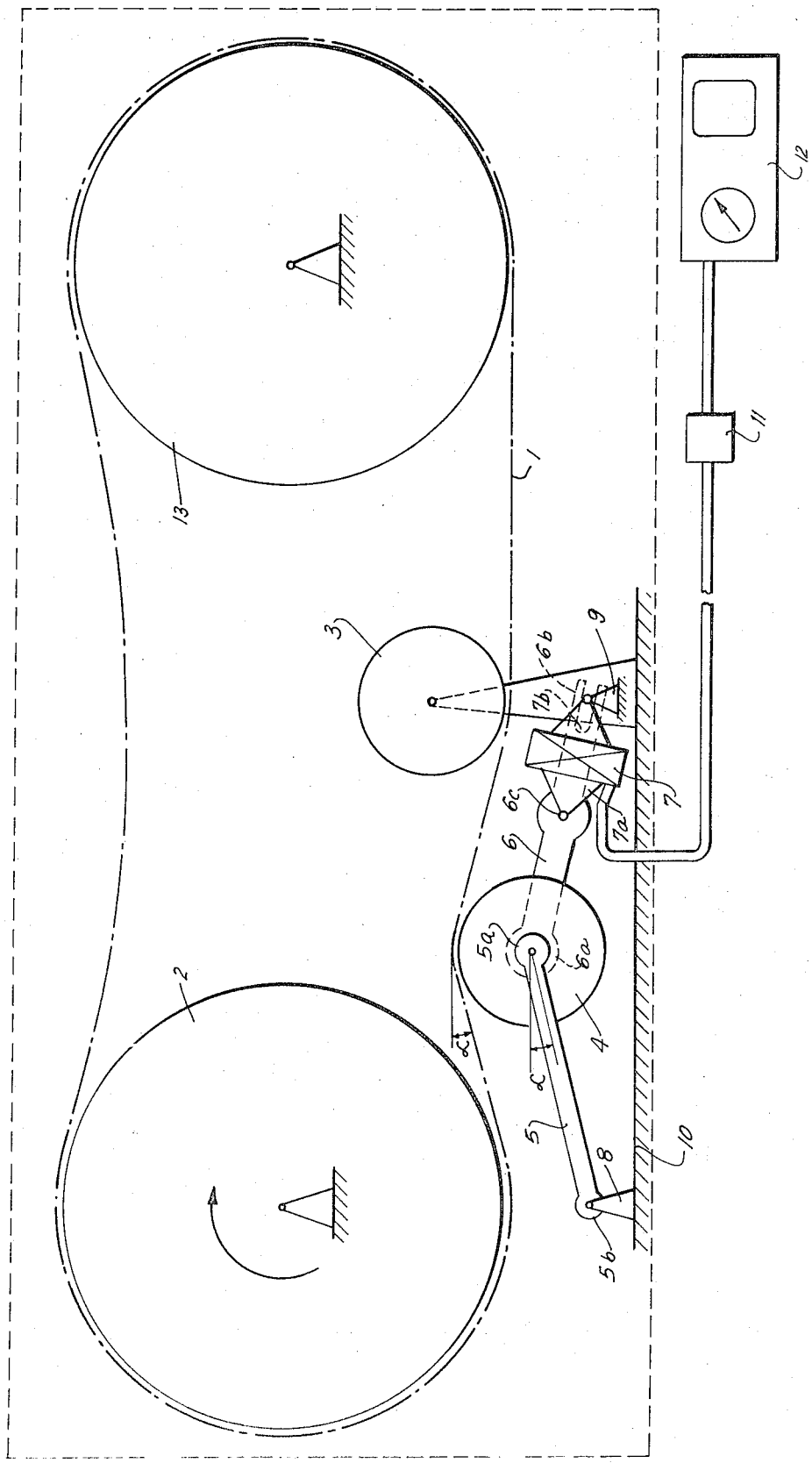

In the embodiment shown in FIG. 3, the deflection system in accordance with the invention is applied to a chain or transmission belt type line subjected to tension in motion to produce a deflecting, self-adjusting torsiometer for transmissions, particularly for drilling rigs in the oil industry. In this embodiment, the apparatus has a construction similar to the embodiment of FIG. 2, with the functional distinction that the chain or belt type line is moving. Consequently, in this embodiment, the transmission chain or belt 1 is deflected relative to a transmission wheel 2 by a free roll 3 with the help of deflection roll 4. The geometrical deflection system created in this way does not depend on the distance between the two transmission wheels 2 and 13, and can have a reduced overall size so as to be mountable inside the transmission housing in front of the transmission wheel 2 used in the deflection system.

The system of FIG. 3 with its deflection bars 5 and 6 is similar to that of the embodiment of FIG. 2; however, the common plate 10 joining the system has a different construction as it is secured to the housing of the transmission in a fixed geometrical position relative to the revolving center of the transmission wheel 2. The pressure variations in the dynamometer 7 are perceived by means of an indicating system 12, which is also similar to that of the embodiment of FIG. 2. System 12 indicates and continuously records the tension force (T) in the chain or belt which is equal to the peripheral force (T) on the transmission wheel 2 with a radius (r), which in turn is directly proportional to the torsion moment ($M_t$), transmitted accordingly to the classic relationship $M_t = T$.

In accordance with the invention, the following advantages are obtained:

The method allows for dynamometric measurement employing deflection of the actual tension force in a line subjected to stationary or moving tension and ensures self-elimination of any measurement errors resulting from variations in the deflection angle α;

The apparatus, in the embodiment comprising a drillometer for dead end cable, ensures an accurate measurement of the tension force in the cable equal to the accuracy of the dynamometrical transducer, without the necessity of a special dead end drum. It is therefore constructed to function as a drillometer for light drilling rigs and for prospecting machines, or as a transportable precision drillometer;

The apparatus, in the embodiment comprising a torisometer for chain or belt transmissions, ensures an accurate measurement of the tension force in the transmission chains or belts, and respectively of the transmitted torsion moment, which is equal to the inherent accuracy of the dynamometrical transducer, regardless of the distance between the transmission wheels.

Having described the invention, what is claimed as new and desired to be secured by Letters Patent is:

1. A method of dynamometrically measuring the tension force in a line subjected to static or moving tension comprising, in combination:
   A. deflecting a portion of said line to produce two branches each forming a deflection angle α with the axis of the adjacent, non-deflected line,
   B. providing a pair of articulated deflection bars each parallel and equal in length to one said branch and joined by a deflection member in contact with and biased by the deflected portion of said line,
   C. maintaining each deflection bar parallel to the corresponding branch regardless of variations in tension in said line, and
   D. measuring the axial force exerted in at least one said deflection bar as a result of the biasing force of said deflected portion as it varies under tension.

2. An apparatus for measuring the actual tension force exerted in a line subjected to static or moving tension comprising, in combination:
   A. means for deflecting a portion of the line to produce two branches each forming a deflection angle α with the axis of the adjacent, non-deflected line,
   B. a pair of deflection arms journalled together at one end with a deflection roll and each pivoted at opposite ends thereof spaced coextensively with the deflected portion of the line,
      1. said deflection roll being in position to contact and be biased by the deflected portion of the line,
      2. one said arm being of fixed length equal to the length of one branch of said deflected portion and maintained parallel to said one branch,
      3. the other said arm being maintained parallel to the other branch of said deflected portion and carrying an axially mounted dynamometer, whereby the angle between the two deflection bars is maintained equal to the deflection angle α regardless of the tension exerted in the line, and
   C. means for monitoring signals from said dynamometer.

3. An apparatus as defined in claim 2 for use as a torsiometer wherein said means for deflecting a portion of the line includes a transmission wheel mounted adjacent one side of said deflection roll and a free roll mounted adjacent the opposite side of said deflection roll.

* * * * *